Jan. 22, 1952      E. H. LYNALL      2,583,270

PRODUCTION OF TUBULAR RIVETS AND SIMILAR ARTICLES

Filed Sept. 22, 1947      2 SHEETS—SHEET 1

Inventor
E. H. Lynall
By
E. F. Wendoroth
Attorney

Jan. 22, 1952  E. H. LYNALL  2,583,270
PRODUCTION OF TUBULAR RIVETS AND SIMILAR ARTICLES
Filed Sept. 22, 1947  2 SHEETS—SHEET 2
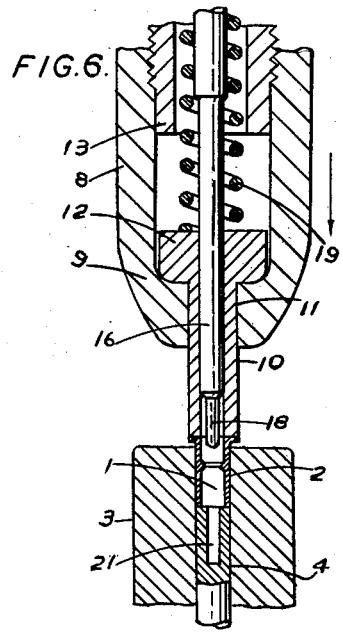
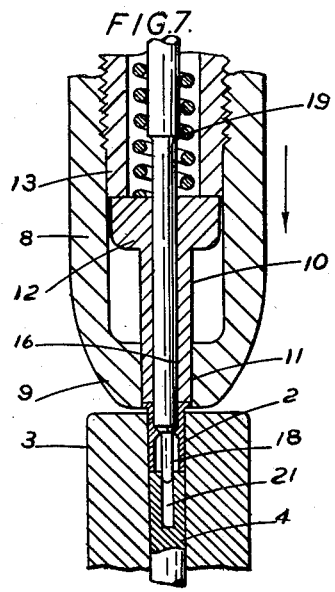
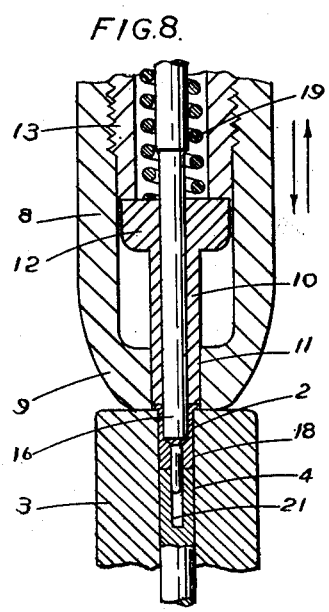
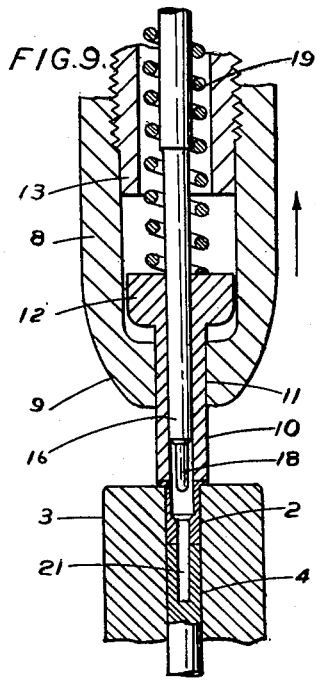

Patented Jan. 22, 1952

2,583,270

UNITED STATES PATENT OFFICE 2,583,270

PRODUCTION OF TUBULAR RIVETS AND SIMILAR ARTICLES

Ezra Herbert Lynall, Four Oakes, England

Application September 22, 1947, Serial No. 775,510
In Great Britain August 18, 1947

10 Claims. (Cl. 10—11)

1

This invention relates to the production of tubular metal rivets and is especially applicable to the production of a so-called blind rivet having its shank portion made of constant outside diameter, with a stepped bore made by forming a counterbore in one end of the bore so as to reduce the diameter of the bore at one end of the shank to increase the wall thickness of the shank at that portion and thus permit of internal screw-threading in the thick walled portion, said blank being provided with a head-forming flange around the mouth of the counterbore. A blind tubular rivet of this character is adapted to be installed by inserting the tubular shank of the rivet into aligned holes in two or more plate portions to be riveted so that the head-forming flange of the rivet lies upon the face of one of the plates, holding the head against movement and simultaneously applying axially a steady force or a single sharp blow or a series of percussions, e. g. by means of a push-rod or of a pull-rod engaged with the screw-threaded portion of the bore or by means of an equivalent mandrel-like member, so as to cause the thin-walled portion of the shank to collapse by outward bulging in order to form a flange opposed to the rivet head, the plates being held between said head and flange.

The main object of the present invention is to provide improved methods of producing a tubular metal rivet of the above character from long lengths of tubing.

A further object of the invention is to provide improved methods of and apparatus for cold forging a rivet blank having a flanged head and a stepped bore from a short length of straight tubing having a uniform wall thickness.

Figure 1:
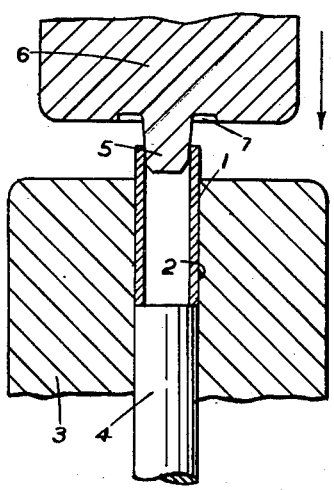
Figure 2:
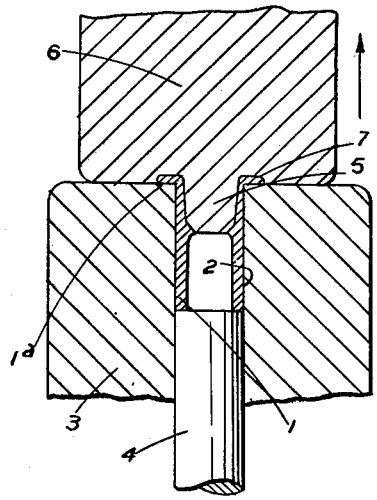
Figure 3:
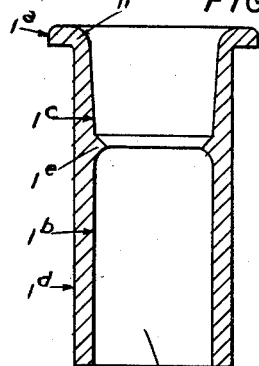
Figure 4:
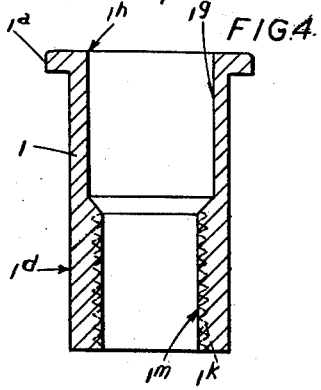
Figure 5:
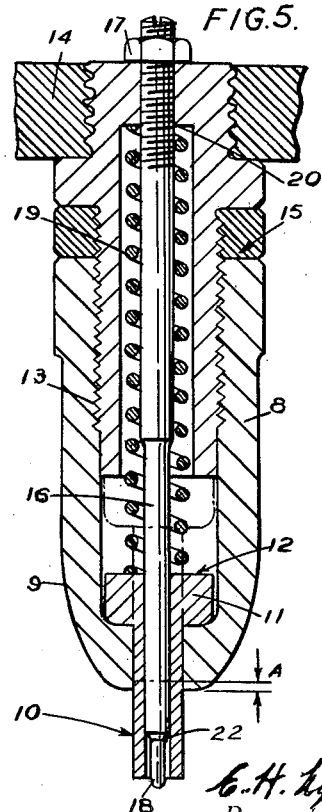

In order that the invention may be more readily understood a method of and apparatus for producing a tubular flanged rivet with a stepped bore from seamless metal tubing will now be described with the aid of the accompanying drawings, wherein:

Figure 1 is a sectional view of the die and the preforming punch at the commencement of the preforming operation, Figure 2 is a sectional view of the die and the preforming punch at the termination of the preforming operation, Figure 3 is a sectional view of the partly formed rivet as it appears after the preforming operation, Figure 4 is a sectional view of the rivet as it appears after the finish forging operation, Figure 5 is a sectional view of the punch employed in the finish forging operation, and

2

Figures 6, 7, 8 and 9 are sectional views of the die and the finishing punch at various stages of the finish forging operation.

Figures 1 and 2 showing the preforming operation are drawn to a larger scale than Figures 6, 7, 8 and 9 showing the finish forging operation. Figure 5 is drawn to a larger scale than that used for Figures 1 and 2 and Figures 3 and 4 are drawn to the same scale which is larger than that used in any other figure.

The tubular rivet illustrated in Figure 4 of the accompanying drawings is complete except for the forming of a female screwthread in the thickened wall of the rivet and for its production short blanks are parted-off from seamless tube made of any suitable malleable or deformable material, such as a heat-treated aluminum alloy, the blanks being barrelled or otherwise dressed to remove any burrs formed by the cutting saw and one such straight tubular blank 1 of constant outside diameter and uniform wall thickness is inserted in the cavity 2 in the die 3 of a rivet heading machine, as shown in Figure 1. The blank 1 is a snug fit within the die cavity 2, the inner end of which is provided by the end face of an ejector 4. The ejector 4 is arranged so that part of the blank 1 projects out from the die cavity 2 and the position of the ejector 4 is adjusted between the two successive heading operations to which the blank 1 is subjected. The first heading operation is for preforming purposes and is effected by means of a tapered spigot punch 5 which projects from the end face of a solid punch body 6, a flange-bending die cavity 7 surrounding the root end of the spigot punch 5. In a single stroke this first punch, by means of axially applied pressure, preforms a flange 1ᵃ by engaging the projecting end of the blank 1 and flattening it out in the punch cavity 7 and also initially modifies the normally straight bore 1ᵇ of the blank by displacing metal in the bore mouth toward the non-flanged end of the blank by means of the spigot punch 5. At the end of the first heading or preforming operation the blank 1 has the shape shown in Figure 3, that is, with a partly formed counterbore 1ᶜ in the mouth of the blank 1 at the end thereof having the preformed head flange 1ᵃ. The diameter of the outside surface 1ᵈ and the original bore 1ᵃ beyond the partly formed counterbore 1ᶜ remain unchanged as the result of the preforming operation, there being a rough shelf 1ᵉ formed between said partly formed counterbore 1ᶜ and the unchanged length of bore 1ᵇ. In order to ensure turning over of the end of the straight blank to form the head flange 1ª a generous radius has to be provided at the junction between the spigot punch 5 and the die cavity 7 and this is reproduced in the preformed blank as indicated at 1ᶠ in Figure 3. If desired, the second heading or finish forging operation may be effected after the blank has been transferred to another die in another machine or in the same machine, but for preference the finishing operation is carried out while the partly formed blank is held in the same die cavity as that in which it is held during the preforming operation.

For purposes of economical production, however, the rivet heading machine would be run for preforming a batch of blanks before any rivet is finished forged.

At the end of the preforming stroke of the machine the opposed faces of the die 3 and of the punch body 6 are in abutment so that the preformed flange 1ª is confined within a closed space. The ejector 4 of the die 3, assuming the same die is used for the finishing operation, is accordingly adjusted prior to the finish forging operation, in order to decrease the length of the die cavity 2, so that when the preformed blank 1 is re-inserted therein its head end projects beyond the face of the die 3 so as to space the head flange 1ª therefrom, as shown in Figure 6. The re-inserted blank 1 is forced back hard against the ejector 4 by the punch assembly used for the finishing operation.

The finishing punch assembly is shown in Figure 5 and comprises a hollow punch body 8 having a bored nose 9 within which is telescopically slidable the sleeve-like forward end 10 of a hollow ram 11. The head 12 of the ram 11 is accommodated within a space formed within the hollow nose 9 and at the end of a hollow externally screwthreaded base 13 which is mounted on the punch-holding slide 14 of the rivet heading machine. The body 8 is screwed on to the base 13 and is locked in position by the nut 15. Centrally within the base 13 and body 8 is a mandrel 16 which is attached to the base 13 by a screwed connection so that the mandrel 16 can be axially adjusted in relation to the base 13 and to the adjustable body 8 and secured in the adjusted position by a locknut 17. The forward end of the mandrel 16 is formed with a pilot 18 and is slidably accommodated within the bore of the sleeve 10 and head 12 of the telescopic ram 11. A coiled compression spring 19 encircles the mandrel 16 and is interposed between the head end 20 of the base 13 and the top of the ram head 12 so as normally to project the sleeve 10 of the ram 11 as far out of the nose 9 as possible. It will be readily understood that the mandrel 16 is fixed relatively to the body 8 and that the ram 11 telescopes between the inner mandrel 16 and the outer body 8.

While the punch assembly is approaching the operative position there is no relative movement between the components thereof, the resistance of the spring 19 being sufficient, on the ram sleeve 10 contacting with the head flange 1ª of the preformed blank 1, to force the blank 1 hard down upon the ejector 4. During the period of sustained axial pressure which follows the forcing home of the blank 1 hard on to the ejector 4 the stiffness of the blank 1 is sufficient to overcome the opposition of the spring 19 with the result that the telescopic ram sleeve 10 is forced back until it seats solidly against the end of the base 13. Before this position has been reached the mandrel 16 has entered into the preformed counterbore 1ᶜ of the blank 1 and by the time the ram 11 has reached the position in which it is arrested by the base 13, as shown in Figure 7, the pilot 18 of the mandrel 16 has partly entered a socket 21 in the ejector 4, the conical neck 22 between the mandrel 16 and its pilot 18 has contacted with the shelf 1ᵉ (see Figure 3) in the blank 1 and the end face of the ram sleeve 11 has retreated into the bore of the body nose 9 sufficiently to form around the mandrel 16 an annular space within which the preformed flange 1ª is accommodated. As the ram 11 cannot retreat any further into the punch body 8, the ram 11, the punch body 8, and the mandrel 16 continue to advance in unison for the final stage of the finishing operation, until the nose 9 of the punch body 8 contacts with the face of the die 3 and thus constitutes a closed cavity within which the head flange 1ª of the blank 1 is trapped, as shown in Figure 8. One result of this final stage in the finishing operation is that the generous radius 1ᶠ made on the blank 1 in the preforming operation disappears, leaving the mouth of the counterbore 1ᵍ (Figure 4) with a sharp corner 1ʰ. The other result of this final stage in the finishing operation is that the act of forcing the blank 1 into the die cavity 2 causes the metal displaced by the axial pressure of the punch assembly to shrink around the uncovered portion of the pilot 18, the diameter of which corresponds to that required for the smaller diameter of the stepped bore of the finished rivet.

On completion of the operating stroke of the punch base 13, the mandrel 16 and the punch body 8 withdraw, leaving the ram 11 projected (see Figure 9) under the action of its spring 19 so as to extract the mandrel 16 from the finished blank without lifting the latter from the die cavity 2. When the whole punch assembly has eventually risen clear of the die 3 the ejector 4 is operated in known manner to expel the finished blank. The ejected rivet having the form shown in Figure 4 requires little or no finishing apart from tapping of the screwthread 1ᵏ (indicated in dotted lines) in the small diameter portion 1ᵐ of the bore, by any suitable method and means.

It will be readily appreciated that by appropriately adjusting the punch body 8 and the mandrel 16 in relation to the punch base 13 the amount of retreat A of the ram 11 within the body 8 may be varied to forge head flanges of different thicknesses.

I claim:

1. A method of cold forging by means of a rivet heading machine a tubular rivet having an external head flange at one end only of a shank of plain cylindrical external form provided with a stepped bore formed by making a thickened wall portion of substantial length at the unflanged end of the shank from a tubular blank in the form of an unflanged cylindrical shell of substantially uniform bore and wall thickness, comprising a preforming operation and a finishing operation performed on said tubular blank, said preforming operation consisting in initially forming the flanged head by pressure applied axially by means of a first punch and said finishing operation consisting in forming the bore of the tubular blank by pressure applied axially by a second punch which upsets inwardly part of the metal forming the interior of said blank to cause it to shrink onto a stepped mandrel carried by said second punch, said stepped mandrel having one part with an external diameter approximately the same size as the uniform bore of the blank, and another part with an external diameter appreciably smaller in size than the uniform bore of the blank, said blank being accommodated snugly during the preforming operation and during the finishing operation within a die cavity which restrains the blank against any appreciable swelling.

2. A method of machine forging a flanged-head tubular rivet or similar metal article having a shank with a non-uniform bore from a tubular blank having a bore of substantially uniform diameter throughout, comprising a preforming operation and a finishing operation performed on the said tubular blank, said preforming operation consisting of initially forming a head flange on one end of said blank, by pressure applied axially by a first punch, and said finishing operation consisting in forming the bore of the blank by pressure applied axially by a second punch which internally upsets part of the metal forming said blank to cause it to shrink onto a mandrel carried by said second punch and accommodated snugly during both operations within a die cavity which restrains the blank against any appreciable swelling.

3. A method as claimed in claim 2 characterized in that the preforming and finishing operations are effected in succession without removing the tubular blank from its shape-conserving cavity in the blank-holding die.

4. A method of cold forging by means of a rivet heading machine a tubular rivet having an external head flange at one end only of a shank of plain cylindrical external form provided with a stepped bore formed by making a thickened wall portion of substantial length at the unflanged end of the shank from a tubular blank in the form of an unflanged cylindrical shell of substantially uniform bore and wall thickness, comprising a preforming operation and a finishing operation performed in succession while the tubular blank is accommodated snugly within a die cavity which restrains the blank against any appreciable swelling, said preforming operation consisting of applying axial pressure by a first punch for initially forming the head flange and for initially modifying the bore by displacement toward the unflanged end of said blank of metal from the mouth of the head end of said blank, and said finishing operation consisting in finish forming said bore by applying axial pressure by a second punch which upsets inwardly part of the metal forming the interior of the blank to cause it to shrink onto a stepped mandrel carried by said second punch, said stepped mandrel having one part with an external diameter approximately the same size as the uniform bore of the blank, and another part with an external diameter appreciably smaller in size than the uniform bore of the blank, and in finish forming the head flange in a cavity formed between said blank-holding die and said second punch.

5. A method as claimed in claim 4, wherein a generous corner radius is formed in the mouth of the bore at the head end of the tubular blank in the preforming operation and the mouth radius is reduced so as to provide a substantially sharp corner in the following finishing operation.

6. A method of cold forging by means of a rivet heading machine a tubular rivet having an external head flange at one end only of a shank of plain cylindrical external form provided with a stepped bore formed by making a thickened wall portion of substantial length at the unflanged end of the shank from a tubular blank in the form of an unflanged cylindrical shell of substantially uniform bore and wall thickness comprising the steps of cutting said tubing into short-length blanks, inserting a blank into the cavity of a die in which said blank is diametrically a snug fit, and forming the head flange by application of pressure along the axis of the tube and forming the counterbore by upsetting inwardly the interior of the blank to cause it to shrink on to a shape-defining stepped mandrel having one part with an external diameter approximately the same size as the uniform bore of the blank, and another part with an external diameter appreciably smaller in size than the uniform bore of the blank.

7. Apparatus for cold forging a tubular rivet having an external head flange at one end only of a shank of plain cylindrical external form provided with a stepped bore formed by making a thickened wall portion of substantial length at the unflanged end of the shank from a tubular blank in the form of an unflanged cylindrical shell of substantially uniform bore and wall thickness, comprising a frame, a die fixed on said frame and having a cavity adapted to receive snugly the tubular blank and a co-operating punch movable on said frame relative to said die and comprising a punch body, a hollow ram telescopically slidable within said punch body and adapted to apply pressure on the head end of the blank in the direction of the longitudinal axis, and a mandrel over which said hollow ram slides, said mandrel being fixed within said punch body and axially adjustable in relation to the punch body for determining the depth of said counterbore and adapted to apply axial pressure in the same direction as the ram to upset inwardly part of the metal of the interior of the blank to cause it to shrink on to said mandrel which has an external stepped shape corresponding to that required in the bore of the finished article, namely one part with an external diameter approximately the same size as the uniform bore of the blank and another part with an external diameter appreciably smaller in size than the uniform bore of the blank, said ram being adapted to telescope into the punch body sufficiently to constitute within the mouth of the bore of said punch body in which said ram slides and around said mandrel a cavity defining the overall diameter and the thickness of the finished flanged head of the tubular blank, said punch cavity being closed by abutment against a face of the blank-holding die.

8. Apparatus for cold forging a tubular rivet having an external head flange at one end only of a shank of plain cylindrical external form provided with a stepped bore formed by making a thickened wall portion of substantial length at the unflanged end of the shank, from a tubular blank in the form of an unflanged cylindrical shell of substantially uniform bore and wall thickness, comprising a frame, a die fixed to said frame and having a cavity adapted to receive snugly the tubular blank and first and second punch means movable on said frame for co-operating with said die in succession, said first punch means being adapted to preform a head flange on one end of said blank and to preform the counterbore by means of a spigot punch and a surrounding bending die cavity, and said second punch means consisting of a punch body, a hollow ram telescopically slidable within said punch body and adapted to apply pressure on the head end of the blank in the direction of the longitudinal axis, a stepped mandrel fixed within said punch body so as to guide said hollow ram which slides over said mandrel, said mandrel having one part with an external diameter approximately the same size as the uniform bore of the blank and another part with an external diameter appreciably smaller in size than the uniform bore of the blank and being adapted to apply axial pressure in the same direction as the ram to upset inwardly part of the metal of the interior of the blank to cause it to shrink onto said mandrel, said ram and mandrel combining with the punch body and die to constitute a closed cavity which produces the final form of the flanged head of the blank.

9. Apparatus as claimed in claim 8 characterised in that the ram of said second punch means is adapted to telescope into the punch body against spring resistance sufficiently to constitute within the mouth of the bore of said punch body in which said ram slides and around said mandrel a cavity defining the overall diameter and the thickness of the finished flanged head of the tubular blank, said punch cavity being closed by abutment against a face of the blank-holding die.

10. Apparatus as claimed in claim 8, characterised in that the mandrel of said second punch means, is axially adjustable in relation to the punch body for the purpose of determining the depth from the end face of the head end of the blank of the counterbore which results in the formation of the stepped bore.

EZRA HERBERT LYNALL.

REFERENCES CITED

The following references are of record in the file of this patent:

UNITED STATES PATENTS

| Number | Name | Date |
|---|---|---|
| 430,539 | Parmelee | June 17, 1890 |
| 472,504 | Kitsmiller | Apr. 5, 1892 |
| 722,669 | Bringham | Mar. 17, 1903 |
| 1,214,070 | Proske | Jan. 30, 1917 |
| 1,618,446 | Kuhne | Feb. 22, 1927 |
| 1,702,310 | Oakley | Feb. 19, 1929 |
| 1,718,630 | Brown | June 25, 1929 |
| 1,900,572 | Lyman | Mar. 7, 1933 |
| 2,040,939 | Huck | May 19, 1936 |
| 2,045,629 | Huck | Sept. 15, 1936 |
| 2,436,185 | Torresen | Feb. 17, 1948 |